United States Patent
De Bruyn et al.

(10) Patent No.: US 6,186,517 B1
(45) Date of Patent: Feb. 13, 2001

(54) PILOT TOOL FOR CENTERING AND CLAMPING

(75) Inventors: Gerard De Bruyn, Antony; Michel Beffrieu, Gournay, both of (FR)

(73) Assignees: Michel Beffrieu, Gournay; Christine Menage; Armand Dawidowicz, both of Neuilly sur Seine, all of (FR)

(*) Notice: Under 35 U.S.C. 154(b), the term of this patent shall be extended for 0 days.

(21) Appl. No.: 09/331,735

(22) PCT Filed: Dec. 23, 1997

(86) PCT No.: PCT/FR97/02411
§ 371 Date: Jul. 16, 1999
§ 102(e) Date: Jul. 16, 1999

(87) PCT Pub. No.: WO98/28110
PCT Pub. Date: Jul. 2, 1998

(30) Foreign Application Priority Data

Dec. 24, 1996 (FR) .................................................. 96 15946

(51) Int. Cl.[7] .................................................. B23B 31/02
(52) U.S. Cl. .................................. 279/141; 279/133; 279/134; 294/97
(58) Field of Search .................................. 279/2.24, 133, 279/134, 141; 294/97

(56) References Cited

U.S. PATENT DOCUMENTS

| | | | |
|---|---|---|---|
| 1,848,317 | * 3/1932 | Church | 279/134 |
| 2,890,053 | * 6/1959 | Walker | 279/141 |
| 2,922,657 | * 1/1960 | Garrison et al. | 279/141 |
| 3,233,908 | * 2/1966 | Schwarzmayr et al. | 279/141 |
| 4,881,745 | * 11/1989 | Peters | 279/4 |
| 5,562,007 | * 10/1996 | Seymour | 279/141 |

FOREIGN PATENT DOCUMENTS

| | | | |
|---|---|---|---|
| 163219 | * 12/1985 | (EP) . |
| 881571 | * 4/1943 | (FR) . |
| 2340798 | * 9/1977 | (FR) . |
| 96/35547 | * 11/1996 | (WO) . |

* cited by examiner

Primary Examiner—Steven C. Bishop
(74) Attorney, Agent, or Firm—Young & Thompson

(57) ABSTRACT

A tool for centering and clamping of at least a part (P) to be fixed in position and comprising a through passage and adjusted for the tool, comprises a pilot device borne at the end of a case having an upper face forming a support for the part and clamping members. The tool further comprises elements for driving the clamping members between a centering position in which the clamping members are retracted into the pilot device and a plurality of clamping positions in which the clamping members project outside the pilot device and rest on the part (P). The driving elements are arranged for simultaneously pivoting and translating the clamping members between the centering position and the clamping position. The invention is useful for handling parts to be fixed in position.

8 Claims, 2 Drawing Sheets

PILOT TOOL FOR CENTERING AND CLAMPING

CROSS REFERENCE TO RELATED APPLICATION

This is the 35 USC 371 national stage of International application PCT/FR97/02411 filed on Dec. 23, 1997, which designated the United States.

FIELD OF THE INVENTION

The present invention relates to the field of centering and gripping tools for handling pieces to be fixed in position such as metal sheet and, more generally, a centering and gripping tool of at least one member comprising a guide member carried by the end of a casing, gripping members and drive means for the gripping members between a centered position in which they are retracted within the guide member and a plurality of gripping positions in which the gripping members project outside the guide member and bear on the piece.

BACKGROUND OF THE INVENTION

Known gripping tools generally comprise a hydraulic or pneumatic jack permitting actuation of a gripping member such as a gripping arm which is drivable pivotably between an active gripping position on the piece and an inactive position. Such a tool can also comprise a guide which is introduced into a passage provided in the piece to be treated, which permits correctly centering the tool on the piece.

From FR-A-2 340 798, there is known a gripping tool whose gripping arm comes into abutment against the piece to be gripped by pivotably driving this gripping arm. This pivotal driving of the gripping arm between the release position and the gripping position is obtained by an articulated linkage mounted on a rod driven in linear displacement by a jack.

This pivotal movement of the gripping arm in this type of gripping tool has the drawback that, with certain pieces to be treated, there is obtained bad gripping, for example when the surface of the piece to be treated is not perfectly flat. In this case, the gripping arm is not always correctly positioned on the piece and does not guarantee good gripping. There exists moreover the risk of deformation of the piece.

Moreover, in the case of a gripping tool provided with a guide, the contact point of the gripping arm on the piece is relatively far from the centering point of the tool on said piece, which can give rise to a certain unbalance or require a more complicated structure of the tool.

There is known from WO-A-9635547, an indexing device for a piece through a hole in the piece and comprising a sleeve having an upper surface forming an abutment for a piece, a piston mounted in the sleeve to slide under the influence of drive means between a retracted position within the sleeve and an extended position in which it projects from the upper abutment surface of the sleeve by an end portion forming an indexing pin, a restraining jaw for the piece on the upper abutment surface of the sleeve, movably mounted on the centering pin and means to control the jaw comprising a slide mounted in an axial bore of the piston and having an end forming a cam. These control means are constituted by a slide mounted in an axial bore of the piston to slide under the influence of drive means between a first position in which it ensures the locking of the jaw in its active position by means of an active portion forming a cam driving in pivotal movement the gripping jaws toward said active position, and a second position in which it releases the locking of this jaw by controlling the pivoting of the gripping jaws toward the inactive position.

The drive means comprise among other things a first return spring disposed between the piston and the sleeve to return the piston to its extended position and a second return spring disposed between the sleeve and the slide to return the slide toward its unlocking position of the jaw.

The axial movements of the piston within the sleeve and of the slide in the piston are controlled by a jack. A principal drawback of this type of device is that, in the case of accident, for example upon a cutoff of the air supply, the jack no longer operates and thus, the second return spring blocks the device in the gripping position. Accordingly, in the gripping position, it is thus not possible to free the piece thus held.

Moreover, this structure is relatively complicated and the wear, particularly expansion of the springs, can give rise to correct positioning problems of the jaws with the passage of time.

SUMMARY OF THE INVENTION

So as to overcome these drawbacks, the present invention has for its object a centering and gripping tool of at least one piece to be fixed in position and having a through-passage suitable for said tool, of the type comprising a guide member carried at the end of a casing having an upper surface forming an abutment for said piece, gripping members and drive means for the gripping members between a centered position in which the gripping members are retracted within the guide member and a plurality of gripping positions in which the gripping members project to the exterior of the guide member and bear on the piece, characterized in that the drive means are arranged to drive simultaneously pivotably and in translation said gripping members between the centered position and a gripping position.

Thus, the gripping members are correctly positioned on the piece to be fixed in the course of the step of centering carried out by the emplacement of the guide member through the through-passage which is suitable for the piece and the pivotal drive of the gripping members permits the drive to extend said gripping members outside the guide member and their lowering on opposite sides of the guide member to come into bearing against the piece to be fixed in position, the simultaneous driving in translation of said gripping members leading to the gripping of the piece to be fixed in position against the end of the casing, on the upper surface of which casing there is formed an abutment. Thus, there is ensured complete deployment of the gripping members projecting from the guide member and there is obtained a plurality of gripping positions on the piece to be secured.

Preferably, a first end of the gripping members coming into contact with the piece to be secured has abutment means, such as a finger, suitable to come into bearing against the edge of the through-passage and suitable for the piece to be fixed upon simultaneous action in pivotal movement and translation, of the gripping members from the centered position and toward a gripping position of the pieces to be fixed.

According to another preferred embodiment, the gripping members are constituted by two levers articulated about a medial axis to form a deformable X, each lever having a first end having abutment means and whose second opposite end to the abutment means is connected to the drive means such that, under the influence of said drive means, said second ends of the levers are movable in translation, toward and away from each other, the first ends of said levers being thus driven pivotably and simultaneously in translation, because of the deformation of the X formed by said levers.

Preferably, the levers are elbowed about their axis of articulation and their second end is mounted pivotably about an axle mounted movably in translation in a guide groove of the casing, the end of the links articulated on said second ends of the lever being also mounted pivotably about said axes, such that the driving in translation of the slide gives rise, by means of the links, to a driving in translation of the axles in the groove which causes the second ends of the levers to move toward or away from each other and, as a result, because of the deformation of the levers, the simultaneous driving and pivoting movement and in translation of the first ends of the levers.

In the centered position, the gripping members are retracted within the guide member which has a slot for this purpose. This slot places in communication the interior of the gripping and centering tool with the outside. In particular, it renders accessible the gripping members and the drive means. According to a preferred embodiment, the abutment means have a play such that, in the gripping position, said abutment means close the slot of the guide member thereby protecting the interior of said gripping and centering tool, in particular against spattering of solder which could enter into said tool upon working the secured piece. There is thus avoided all risk of clogging of the mechanism of the gripping members and drive means.

There is thus obtained a tool whose centering and gripping on a piece to be secured are reliable, the gripping members acting on the piece to be secured at the level of the passage through which they are engaged both to permit gripping of said piece and to permit protection of said tool against clogging during welding.

BRIEF DESCRIPTION OF THE DRAWINGS

Other advantages and characteristics of the invention will become more apparent in the course of the following description of an example of a preferred embodiment of the invention, with reference to the drawings, in which.

DETAILED DESCRIPTION OF THE INVENTION

The centering and gripping tool 1 according to the invention comprises a casing 2 at the end of which is mounted a guide member 3 adapted to permit centering of the tool 1 on a piece P to be secured by passing through a suitable through-hole of said piece P. The casing 2 has an upper surface 2' it forming an abutment for the piece P.

Figure 1:
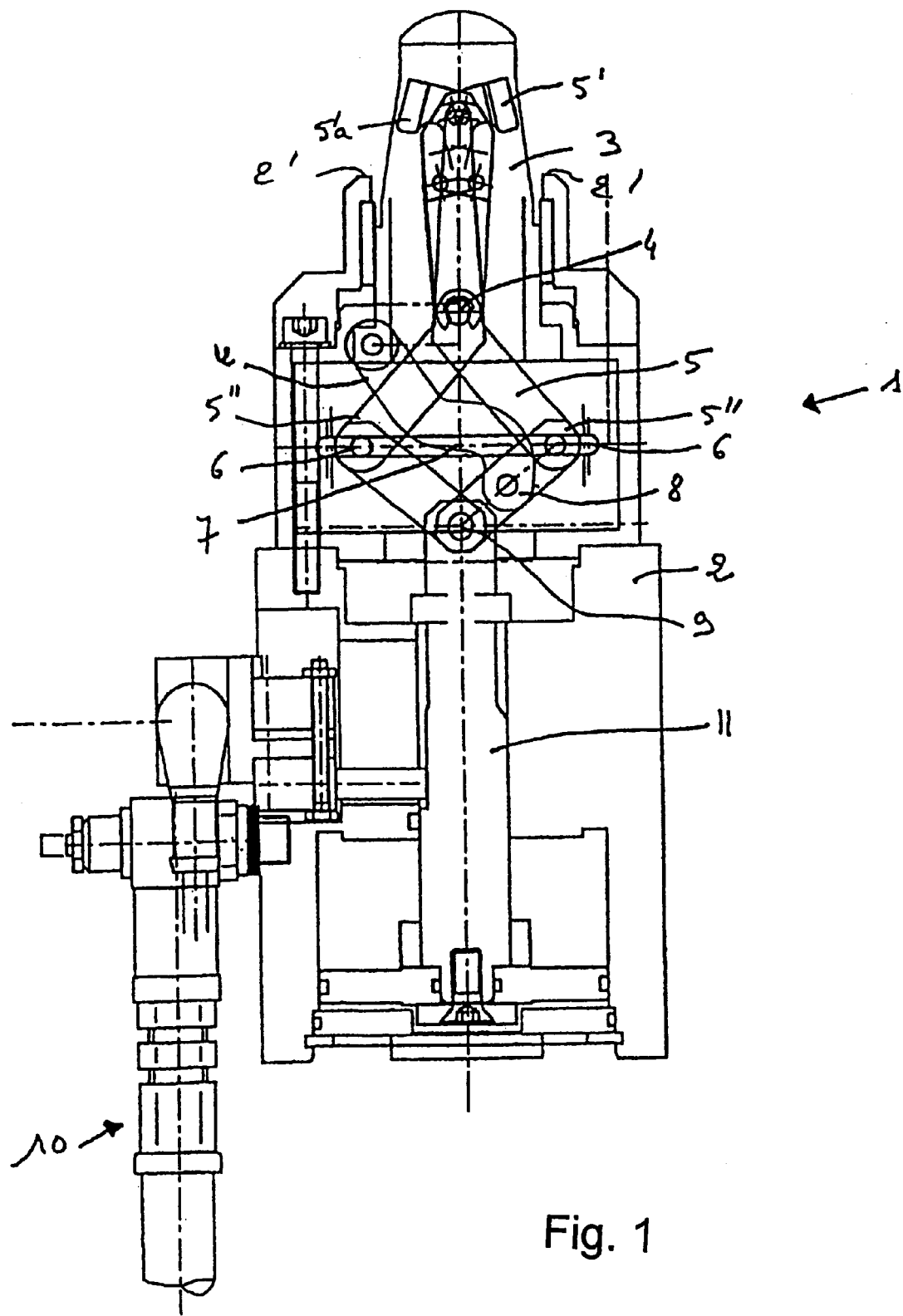
FIG. 1 is a side cross-sectional view of a centering and gripping tool according to the invention, in the centering position.

The gripping members 5 comprise at a first end 5' a gripping finger 5'a and are arranged to be disposed within the guide member 3 in the centered position of the tool 1 (see FIG. 1).

The casing 2 also contains the drive means for the gripping members 5.

The gripping members are constituted by elbowed levers 5, articulated about a medial axle 4 so as to form a deformable X.

The levers 5 are positioned in the casing 2 such that their first end 5' projects outside the casing 2 and, in the centered position of the tool 1, is disposed in a slot in the guide member 3 and their second end 5" is disposed in the casing 2.

The second ends 5" of the levers 5 are pivotally mounted respectively about an axle 6 movably mounted in translation in rectilinear guide grooves 7 of the casing 2, such that a driving in translation of the axles 6 in the groove 7 of the casing 2 causes the moving together and the spacing apart of the second ends 5" of the levers 5 along a linear path, and, as a result, because of the deformation of the X formed by the levers 5, simultaneous driving in pivotal movement and in translation of the first ends 5' of the levers 5 which, from the centered position in which they are retracted within the guide member 3, are driven to project outside said guide member 3 and to lower on opposite sides of said guide member to grip the piece P to be secured.

The translatory drive of the second ends 5" of the levers 5 is effected by two links 8 articulated on said second ends 5" by means of axles 6 of the second ends 5" of each lever 5.

Thus, one end of a first link 8 is connected pivotally to a second end 5" of a first lever 5 by means of a first axle 6 and one end of the second link 8 is pivotally connected to the second end 5" of the second lever 5 by means of the second axle 6.

Another end of the links 8 is mounted pivotally about an axle 9 at one end of a slide 11 controlled by a jack 10 such that the driving and translation of the piston of the jack 10 gives rise to the translatory displacement of the axles 6 in the groove 7, whose longitudinal axis is perpendicular to the longitudinal axis of the slide 11 as is seen in the drawings, giving rise to the spacing or the moving together in a same plane of the second ends 5" of the levers 5.

Thus, in the centered position, as shown in FIG. 1, the links 8 form substantially a V such that the articulation axles 6 are brought toward each other in the groove 7. The second ends 5" of the levers 5 are also brought toward each other such that the X formed by the levers 5 is almost closed, the first ends 5' of the levers 5 thus being similarly brought together so as to be disposed within the drive member 3. There can be provided an element 12 which, connected on the one hand to the casing 2 and on the other hand to a link 8, limits the displacement of the links 8 and contributes to the good mechanical strength of the assembly.

Upon actuation of the jack 10, the latter drives with linear displacement the slide 11 and causes a deformation of the V formed by the links 8. In particular, jack 10 drives in translation the ends of the links 8 mounted pivotably about the axle 9 such that the other ends of the links 8 pivotally rise on the axles 6, driving these latter in translation in the groove 7.

The links 8 align with each other along the groove 7 (FIG. 2) thereby causing the spacing of the axles 6 within the groove 7 and, as a result, the spacing of the second ends 5" of the levers 5.

Figure 2:
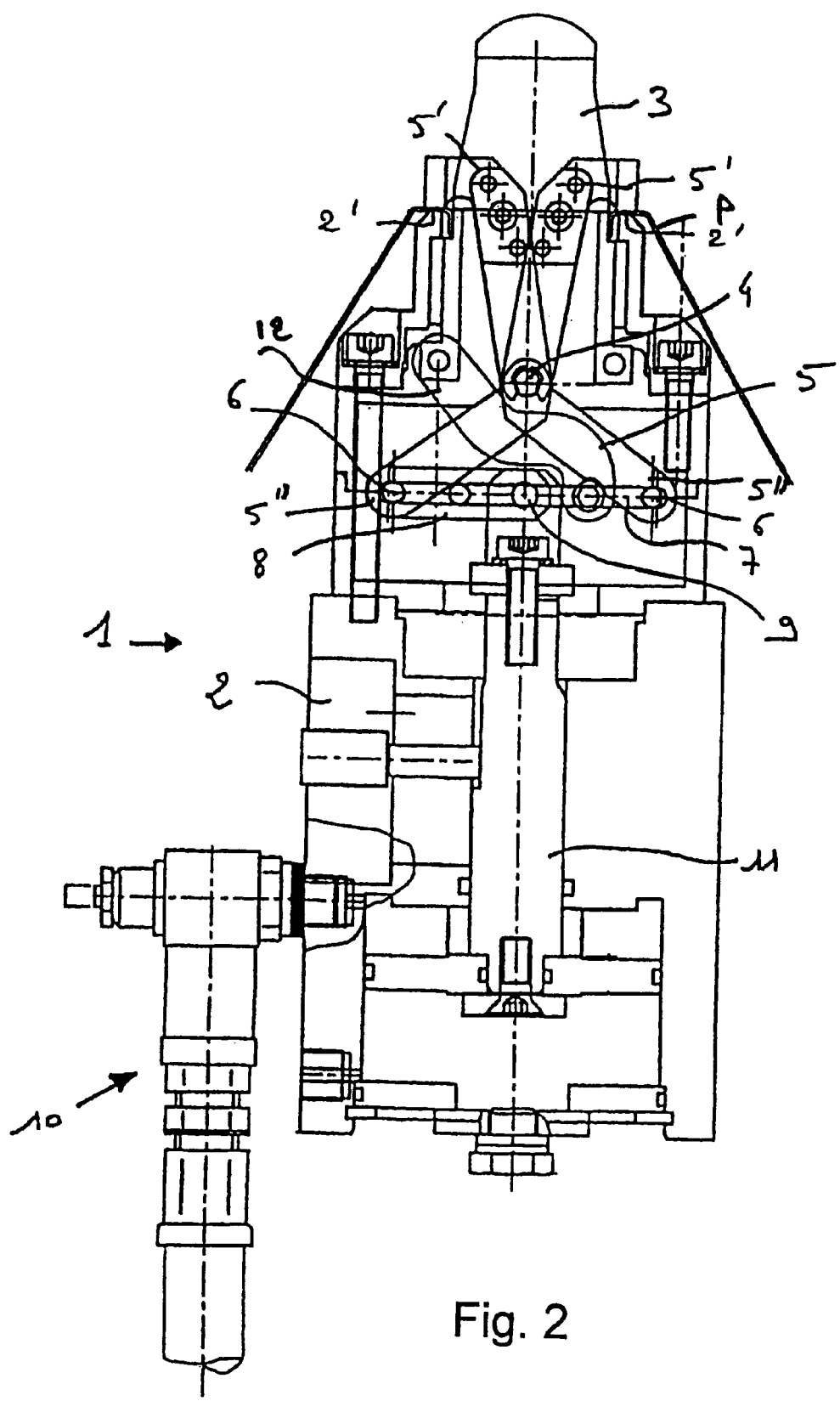
FIG. 2 shows a side cross-sectional view of a tool according to FIG. 1 in the gripping position.

This spacement being carried out by a driving in translation of the second ends 5" of the levers 5 in a same plane, their first ends 5' are simultaneously driven pivotally and in translation so as to come into abutment and into bearing against the edge of the through-passage, adapted and provided in the piece P to be fixed in position, and to grip said piece P fixedly against the end of the casing 2 (see FIG. 2).

In the gripping and centering position thus obtained (FIG. 2), the ends of the links 8 pivotally mounted about the axle 9 on the slide 11 form three aligned points with their opposite ends along the groove 7.

So as to ensure the holding of the tool in this position, in particular in the absence of a source of energy for actuating the jack in the centered and gripping position, the ends of the links 8 pivotally mounted about the axle 9 are slightly driven beyond the line of the three points namely slightly beyond the groove 7. There is thus prevented a rearward return of the tool 1, until a new energy source actuates the tool 1 toward the reverse position.

A hydraulic or pneumatic jack 10 can be used or electrical drive means.

The guide member 3 can be of the type that is movable relative to the casing 2 and retractable. In this case, the emplacement of the guide member 3 through the passage through the piece P to be fixed, can be carried out by drive means common to the gripping members 5, for example by actuation of the jack 10.

The guide member 3 can also be fixedly projecting relative to the casing 2, and in this case it is the assembly which is driven in displacement to position the guide member 3 through the passage passing through the piece P.

So as to be able to use a device according to the invention with variable diameter, height and/or operations concerning the piece to be held, certain elements enclosed in the upper portion of the casing 2 are interchangeable whilst the lower portion of the casing encloses the "motor" portion of the device and remains the same.

What is claimed is:

1. A centering and gripping tool for at least one piece to be fixed in position and comprising a through-passage and being suitable for said tool, the tool comprising:

a guide member carried at the end of a casing having an upper surface forming an abutment for said piece and gripping members;

drive means for driving the gripping members between a centered position in which the gripping members are retracted within the interior of the guide member and a plurality of gripping positions in which the gripping members project outside the guide member and bear on the piece;

said drive means being structured and arranged to drive simultaneously pivotally and in translation said gripping members between the centered position and a gripping position;

said gripping members comprising two levers articulated about a median axis to form a deformable X;

each lever having a first end having abutment means and a second end opposite said abutment means connected to the drive means such that, under the influence of said drive means, said second ends are movable in translation, by moving together or apart, the first ends of said levers being then driven simultaneously in pivoting and in translation because of the deformation of the X formed by said levers.

2. The tool according to claim 1, wherein a first end of the gripping members coming into contact with the piece to be secured has abutment means adapted to come into bearing against the edge of the through-passage of the piece to be secured upon simultaneous pivoting and translatory actuation of the gripping members from the centered position toward a gripping position of the piece to be secured.

3. The tool according to claim 2, wherein the abutment means have a clearance such that, in the gripping position, said abutment means close a slot of the guide member within which they are disposed in the centered position, thereby protecting the interior of said centering and gripping tool.

4. The tool according to claim 1, wherein the drive means comprise a slide controlled by a jack and two links of which one end is articulated to one end of the slide, and whose other end is connected to a second end of a lever so as to transform the translatory path of the jack into a path of a spacing apart and bringing together the second ends of the lever.

5. The tool according to claim 4, wherein the levers are elbowed about their axis of articulation and their second end is mounted pivotably about an axle movably mounted in translation within a guide groove of the casing, the end of the links articulated on said second ends of the levers being also pivotally mounted about said axles, such that the translatory driving of the slide gives rise, by means of the links, to a driving in translation of the axles in the groove which gives rise to the bringing together or spacing apart of the second ends of the levers.

6. The tool according to claim 4, wherein the jack is hydraulic.

7. The tool according to claim 4, wherein the jack is pneumatic.

8. The tool according to claim 1, wherein the guide member is fixed in projection relative to the casing.

* * * * *